United States Patent Office 2,982,583
Patented May 2, 1961

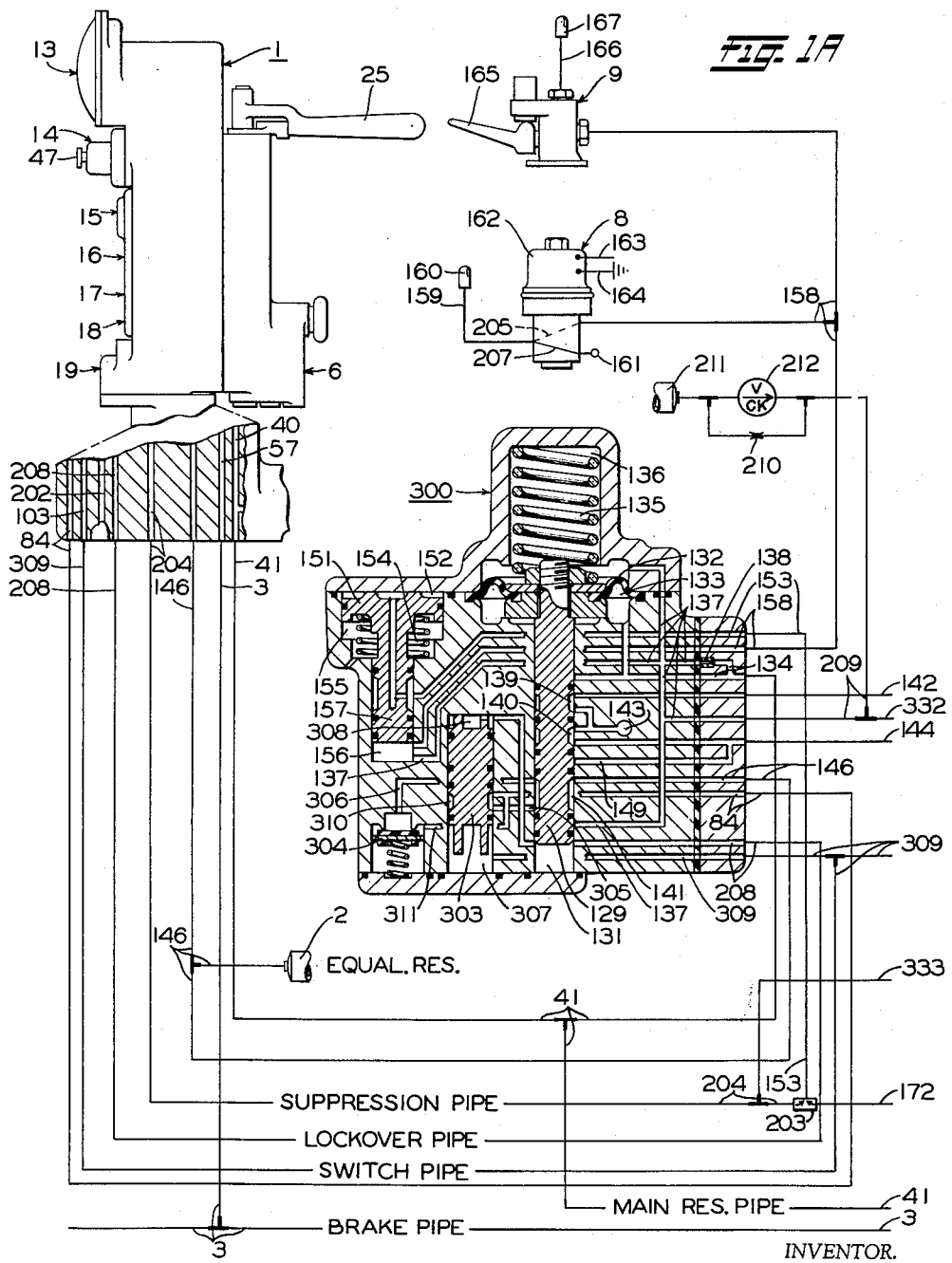

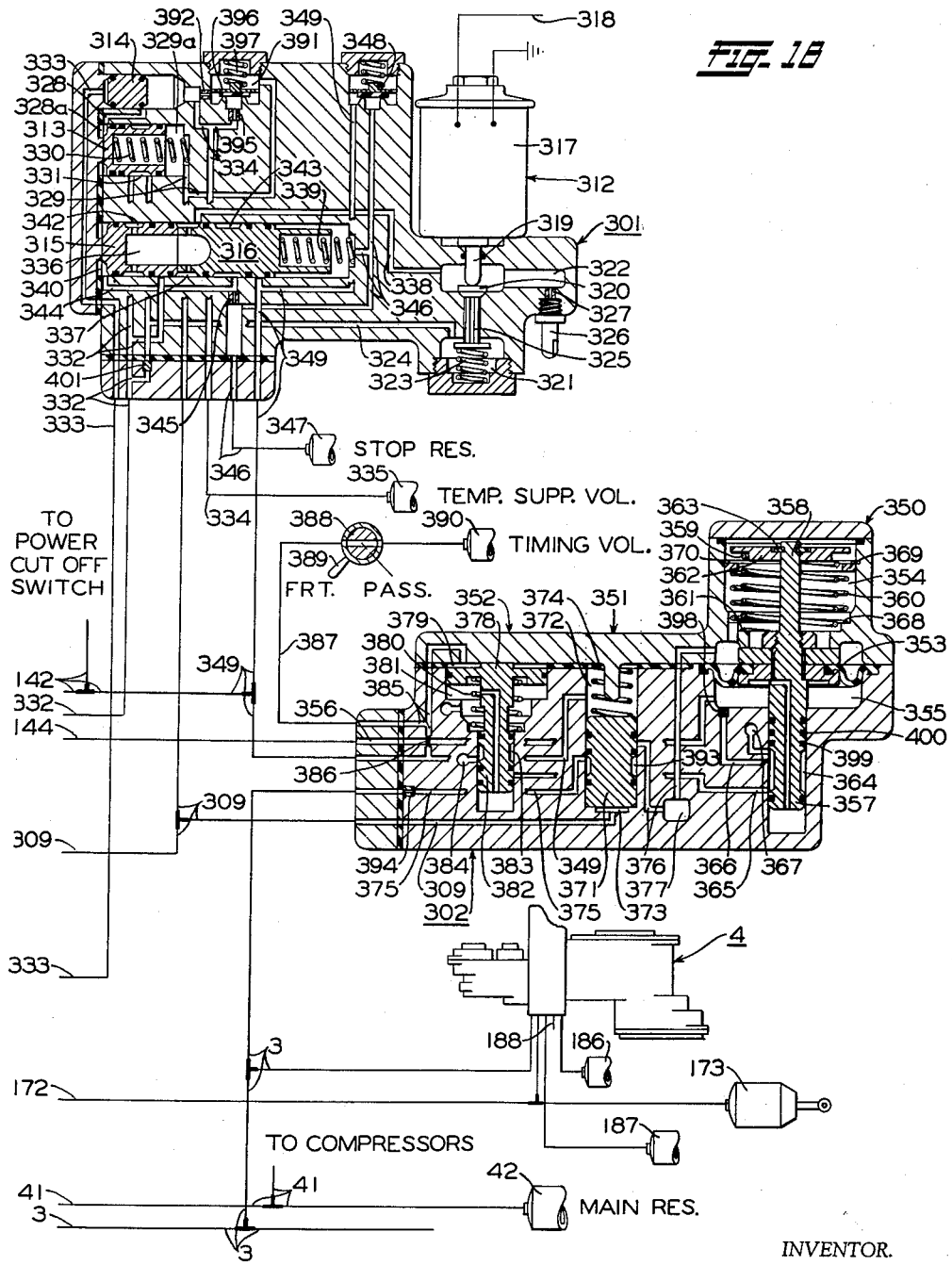

2,982,583

FLUID PRESSURE BRAKE APPARATUS WITH AUTOMATIC CONTROL APPLICATION FEATURE

Harry C. May, East McKeesport, Pa., assignor to Westinghouse Air Brake Company, Wilmerding, Pa., a corporation of Pennsylvania Filed Feb. 23, 1960, Ser. No. 10,336

13 Claims. (Cl. 303—13)

This invention relates to fluid pressure brake apparatus for railway locomotives and more particularly to such apparatus embodying means for effecting an automatic control application of brakes upon the occurrence of a predetermined control condition. The term "automatic control application of brakes" as herein used is intended generically to include a so-called "train control," "safety control" or "overspeed" application of brakes.

It has heretofore been proposed to provide a brake apparatus of the above general type embodying means which, during an automatic control application of brakes, will automatically provide a split reduction in equalizing reservoir pressure and hence in brake pipe pressure for gently gathering slack in a long freight train. However, such split reduction has been accomplished by having equalizing reservoir pressure equalize successively into two volumes or reservoirs referred to in the art as the "reduction limiting reservoir" and the "second reduction reservoir." Since the capacities of these reservoirs are fixed, the amounts or degrees of reduction in equalizing reservoir pressure effected during each of the successive steps or stages of the split reduction will vary according to the value of equalizing reservoir pressure existing just prior to such equalization and hence will vary according to the preselected normal charge value of equalizing reservoir pressure and thus of brake pipe pressure. In other words, if the normal charge value of equalizing reservoir pressure and hence of brake pipe pressure is increased, higher degrees of reduction in equalizing reservoir pressure will be effected during each of the successive stages. This will result in rough gathering of slack and excessive braking when a high (such as about 100 p.s.i.) normal charge value of brake pipe pressure is used if the capacities of these reservoirs are tuned to provide desired slack gathering and braking for a lower (such as 70 p.s.i.) normal charge value of brake pipe pressure; and, on the other hand, if the capacities of the reservoirs are tuned for the higher normal charge value of brake pipe pressure, the reduction in brake pipe pressure effected during the first stage may be insufficient to gather slack and the reduction effected during the second stage may not be sufficient to provide at least a full service application of brakes, as required by the Association of American Railroads.

Since the preselected normal charge value of brake pipe pressure during freight service is preferably 70 p.s.i. when operating over relatively level terrain and is increased to between 90 p.s.i. and 110 p.s.i. when the train enters mountainous terrain, it is frequently necessary during a single run to vary the normal charge value of brake pipe pressure. Hence, it would be desirable from the standpoint of both economy and convenience to provide an improved arrangement wherein, during an automatic control application of brakes occurring while the apparatus is conditioned for freight service and irrespective of the preselected normal charge value of brake pipe pressure and thus of equalizing reservoir pressure, equalizing reservoir pressure would always be reduced during the first stage a chosen degree sufficient to cause effective yet gentle gathering of slack and would always be reduced during the second stage a greater degree for causing at least a full service application of brakes.

One object of this invention is therefore to provide an improved locomotive fluid pressure brake apparatus embodying means for accomplishing the desired result just described.

Another object is to provide, in an apparatus of the above type, means for preventing graduated release of an automatic control application of brakes, and means for permitting manually initiated brake applications of increased degree to be superimposed on an automatic control application of a lesser degree.

Another object is to provide a simplified and improved train control valve device.

Other objects and advantages will become apparent from the following more detailed description of the invention and from the "summary" following such description and from the accompanying drawings wherein Figs. 1A and 1B, when taken together such that the right-hand edge of Fig. 1A is matched with the left-hand edge of Fig. 1B, constitute a diagrammatic view of a locomotive fluid pressure brake apparatus embodying the invention.

Description

To abbreviate the following description, and help distinguish between new and old elements, and also facilitate reference to my copending application U.S. Serial No. 764,296 for structural and operational details not disclosed fully herein, the same reference numerals will be used in the drawings and description of the instant application as were used in my said copending application to designate elements having substantially identical structure and function; and reference numerals commencing with "300" will be used to designate elements not disclosed in my said copending application.

Referring to the drawings, the locomotive brake apparatus embodying the invention comprises an engineer's automatic brake valve device 1, an overspeed magnet valve device 8, and a safety control valve device 9, each fully described in my said copending application and therefore hereinafter described only in sufficient detail to enable an understanding of the present invention. According to the invention, the brake apparatus also comprises an improved application valve device 300, a train control valve device 301, and an automatic split reduction valve device 302.

The application valve device 300 comprises a sectionalized casing containing, in addition to an application valve 129 and a suppressing valve 157, a release control valve 303 and a check valve 304. The valves 129 and 157 are functionally similar to those of the same numbers in my said copending application, except that cavity 141 of valve 129 connects equalizing reservoir pipe and passage 146 to passages 305 and 306 (instead of connecting passage 146 to passage 84) when valve 129 is in normal position in which it is shown.

Release control valve 303, which preferably is of the spool type, is subject opposingly to pressures of fluid in chambers 307 and 308. Chamber 307 is connected via a passage and switch pipe 309 to brake valve passage 103, whereas chamber 308 is always connected via chamber 131 with lockover passage and pipe 208. When pressure in chamber 307 exceeds that in chamber 308, valve 303 will be biased to a normal position, in which it is shown and in which an elongated annular cavity 310 therein connects passage 305 to passage and pipe 84. Check valve 304, which is preferably spring-biased, prevents flow of pressure fluid from a branch 311 of passage 84 to passage 306 but permits flow in the reverse direction.

Train control valve device 301 comprises a sectionalized casing containing a magnet valve device 312, a suppression valve 313, a double check valve 314, and a train control interlock valve device 315, 316.

Magnet valve device 312 comprises a magnet 317 normally energized by a conventional train control electrical circuit, including a wire 318, for causing said magnet, through a plunger 319, to seat a valve 320 to prevent flow of pressure fluid from a chamber 321 to a chamber 322 containing said valve. Upon deenergization of magnet 317, a helical bias spring 323 in chamber 321 will operatively unseat valve 320 for permitting pressure fluid to flow via a passage 324, chamber 321 and along a fluted valve stem 325 and past valve 320 to chamber 322 and thence to atmosphere via a warning whistle 326 at the restricted rate controlled by a choke 327.

Suppression valve 313 is preferably of the spool type and is subject opposingly to the pressure of fluid in a chamber 328a open to a passage 328 and to the pressure of fluid in a chamber 329a open to a passage 329. A helical bias spring 330, which acts in opposition to pressure in chamber 328a, biases valve 313 to a normal or non-suppressing position, in which it is shown and in which an elongated annular cavity 331 therein connects passage 324 to a passage and pipe 332 constituting a branch of control pipe 209. Double check valve 314 is operative to connect a passage and pipe 333 or a passage and pipe 334 selectively to the passage 328 according to which of the passages 333 or 334 is charged to the higher pressure. Pipe 333 constitutes a branch of suppression pipe 204, whereas pipe 334 leads to a temporary suppression volume 335.

The train control interlock valve device 315, 316 comprises two end-to-end abuttable spool-type valves 315 and 316 reciprocable independently or in unison within a common bore. At their adjacent ends valves 315 and 316 are subject to pressure of fluid in a chamber 336 that is constantly open by way of an annular groove 337 in valve 316 and a passage 338 to the chamber 322. A helical bias spring 339 acts on the remote end of valve 316 to operatively bias interlock valve device 315, 316 to a normal or cut-off position, in which it is shown, and defined by contact of the remote end of valve 315 with the end wall of a chamber 340. With valve device 315, 316 in normal position, no fluid pressure connections are established by elongated annular cavities 342 and 343 formed in valves 315 and 316, respectively. Chamber 340 and cavity 343 are both constantly connected to each other by a passage 344 that, in turn, is open via a stop reservoir charging choke 345 to a passage and pipe 346 connected to a stop reservoir 347. Branches of passage 346 lead to the chamber containing spring 339 and also to the seating side of a spring-biased stop reservoir release check valve 348 contained in a chamber open to a passage and pipe 349 constituting a branch of power knock-out pipe 142. Check valve 348 prevents flow of pressure fluid from passage 349 to passage 346 and stop reservoir 347, but permits release flow of pressure fluid in the reverse direction.

The automatic split reduction valve device 302 comprises a regulating valve device 350, a cut-off valve device 351, and a timing valve device 352.

Regulating valve device 350 comprises a fluid pressure motor, preferably in the form of a diaphragm piston 353, having at one side a chamber 354 and at the opposite side a chamber 355 open via a passage 356 to the pipe 144. Coaxially connected to the chamber 355 side of piston 353 is a spool-type regulating valve 357 that is sealingly reciprocable in a bore open at both ends to chamber 355; and coaxially connected to the opposite side of said piston and projecting into chamber 354 is a follower stem 358 encircled by two concentrically arranged helical springs 359, 360. Inner spring 359 bears against a stationary shoulder 361 and acts, through a follower-stem-encircling spring seat 362 and a retaining ring 363 snapped onto stem 358, to operatively bias valve 357 to one limit position, in which it is shown. With regulating valve 357 in this position, an elongated annular cavity 364 in said valve concurrently connects a passage 365 and a passage 366 with a vent port 367. At its respective ends the outer spring 360 bears against a fixed shoulder 368 and against a seat washer 369 that normally contacts a stop 370 (such as a retaining ring snapped into the side wall of chamber 354) to limit the extent of expansion of said spring toward spring seat 362 and thus normally render said spring ineffectual or "caged."

Cut-off valve device 351 may comprise a cut-off valve 371 of the piston-valve type having at one side a chamber 372 connected to a branch of passage 349 and having at the opposite side a chamber 373 connected to a branch of pipe 309. A helical spring 374 in chamber 372 biases valve 371 to a cut-off position, in which it is shown, and in which it isolates a passage 375 from a passage 376 in which is preferably interposed an expansion or dampening volume 377.

Timing valve device 352 comprises a piston 378 subject opposingly to pressure of fluid in a chamber 379 and to pressure of a helical bias spring 380 in an atmospheric chamber 381. Operably connected to the atmospheric side of piston 378 is a reciprocable spool valve 382 having an elongated annular cavity 383 whereby passage 365 is connectable to a vent port 384 in a venting position of said valve. Chamber 379 is connected via one branch of a passage 385 and a timing choke 386 to power knock-out passage 349; and another branch of passage 385 is connected to a pipe 387 that leads to a valve 388. Valve 388 is preferably of the cock type operable by a handle 389 to a freight position, in which it is shown, to connect pipe 387 to a timing volume 390.

*Operation*

Assume initially that the apparatus is devoid of fluid under pressure; that magnet 162 of overspeed magnet valve device 8 is energized in conventional manner via an electrical circuit including wires 163, 164 for cutting off pipe 158 from whistle 160; that magnet 317 of train control magnet valve device 312 is energized in conventional manner from a track circuit, including wire 318, for operatively seating valve 320 to cut off control passage 332 from chamber 322 and the whistle 326; that valve 388 is in freight position; and that selector valve device 6 is in a freight position to condition the brake valve device 1 to control brake controlling valve devices of the direct-release type (such as the well-known AB valve) used on freight cars. Under these conditions, the various components of the apparatus will be in the respective positions in which they are shown in the drawings.

*Initial charging*

To initially charge the apparatus, handle 25 of brake valve device 1 is moved to release position, and the diesel engines are started for operatively charging the main reservoir 42 from the compressors. Pedal 165 of safety control valve device 9 must be depressed to cut off pipe 158 from the whistle 167 and atmosphere. With pipe 158 thus cut off from atmosphere by devices 8 and 9, and with control passage 332 and hence control pipe 209 cut off from atmosphere by train control magnet valve device 312, the apparatus can and will be effectively charged in the following manner.

Main reservoir pressure fluid will be supplied from pipe 41 via passage 134 in device 300 to the chamber 133 side of application valve piston 132 at a substantially unrestricted rate, and will also be supplied via passage 134, choke 138 and passage 137 to the chamber 136 side of said piston at the restricted rate controlled by said choke.

However, choke 138 is of such selected flow capacity that despite this more rapid rate of charging of chamber 133, application valve 129 will remain in normal position, in which it is shown, during initial charging because pressure in chamber 133 will not exceed the pressure in chamber 136 by an amount sufficient to overcome the heavy bias of spring 135, and because chamber 131 will now be vented via lockover pipe 208 which, with brake valve handle 25 in release position, is connected to atmosphere by suppression valve device 18.

Meanwhile, fluid under pressure will flow via a branch of passage 137 and through control pipe 209 and at the restricted rate controlled by a choke 210 to a timing volume 211 for charging the latter. Choke 210 is provided so as not to delay or inhibit effective buildup of pressure in chamber 136; however, a check valve 212, arranged in parallel with choke 210, permits substantially unrestricted flow from volume 211 to pipe 209 in bypass of choke 210 under conditions hereinafter to be described.

Meanwhile, with brake valve handle 25 in release position, it is sufficient for purposes of the present invention to note that suppression valve device 18 will be actuated to a position in which it will vent the lockover pipe 208 and the suppression pipe 204 and supply pressure fluid from main reservoir passage 40 to passage 103 and hence to switch pipe 309. Release control valve 303 will thus be positively biased to normal position in which it is shown because chamber 308 will be vented via pipe 208 and chamber 307 will be charged with pressure fluid via pipe 309. Also, with brake valve handle 25 in release position, the control valve device 14 will be actuated to supply fluid from main reservoir passage 40 to equalizing reservoir 2 at a pressure corresponding to a preselected normal charge value of brake pipe pressure and via a communication including passage and pipe 84, cavity 310 of release control valve 303 in normal position, passage 305, cavity 141 of application valve 129 in normal position and equalizing reservoir pipe 146. Meanwhile, relay valve device 13 which is subject opposingly to equalizing reservoir pressure and brake pipe pressure will operate to supply fluid from the main reservoir passage 40 to the brake pipe 3 at a pressure corresponding to that provided in equalizing reservoir 2 and via a communication including brake pipe cut-off valve device 15 and passage 57. Brake controlling valve device 4 on the locomotive will respond to charging of the brake pipe 3 to connect the brake cylinder 173 directly to brake cylinder release pipe 188 as herein shown for simplification (or, if preferred, via a brake cylinder relay valve, not shown) and charge the control reservoir 186 and supply reservoir 187 from the brake pipe 3, in the well-known manner.

Meanwhile, in train control valve device 301, main reservoir pressure fluid will flow via one branch of switch pipe 309 and passage 329 to a chamber 391 and thence at a very restricted rate via a choke 392 to passage 334 for charging temporary suppression volume 335 to main reservoir pressure. Meanwhile, pressure fluid supplied to passage 334 will shift double check valve 314 leftward (because passage 333 will be vented via the vented suppression pipe 204), thereby admitting pressure fluid to chamber 328a. However, suppression valve 313 will be maintained in its normal or non-suppressing position by spring 330 as well as main reservoir pressure in passage 329. With valve 313 in non-suppressing position, the control pipe 209 will be connected via branch pipe 332 and suppression valve cavity 331 to passage 324 and chamber 321.

Meanwhile, in device 302, chamber 372 of device 351 will be vented via pipe 349, power knock-out pipe 142, application valve cavity 139 and vent port 143; but some of the main reservoir pressure fluid supplied to switch pipe 309 will flow to chamber 373 and thus shift cut-off valve 371 of device 351 upward against resistance of spring 374 to a cut-in position in which an annular cavity 393 in said valve connects pasage 375 with passage 376. This will permit pressure fluid to flow from the brake pipe 3 via a choke 394, passage 375, cavity 393, passage 376 and volume 377 to chamber 354 of regulating valve device 350. Since chamber 355 of device 350 is then vented via passage 356, pipe 144, cavity 140 of application valve 129 in normal position and vent port 143, piston 353 will be shifted downward and carry regulating valve 357 from its one limit position, in which it is shown, through an intermediate position hereinafter to be defined, to another limit position. With valve 357 in this other limit position, passages 365 and 366 will be isolated from each other and from vent port 367.

Timing volume 390 and chamber 379 of device 352 will be vented via choke 386, pipe 349 and the then vented power knock-out pipe 142.

Hence, upon completion of initial charging, all components will be in the respective positions in which they are shown in the drawings except that: the pedal 165 will be depressed to maintain pipe 158 cut off from whistle 167; valve 371 of device 351 will be in cut-in position to connect passages 375, 376; and valve 357 of device 350 will be in its other (lower) limit position to isolate passages 365, 366 from vent port 367.

*Manually effected applications of brakes*

To manually effect a service application of brakes on the locomotive and connected cars of a train, the engineer moves brake valve handle 25 arcuately from release position into an application zone (extending between release position and a service position) an extent corresponding to the degree of service application desired. For the present, it need merely be noted that self-lapping control valve device 14 will thereby be conditioned to permit pressure fluid to flow from equalizing reservoir 2 via the communication 146, 141, 305, 310, 84 and device 19 until equalizing reservoir pressure is reduced a corresponding degree; and relay valve device 13 will operate to effect a reduction in brake pipe pressure corresponding to the reduction thus effected in equalizing reservoir pressure. The brake controlling valve device 44 will respond to this reduction in pressure in brake pipe 3 to supply fluid at a corresponding pressure from supply reservoir 187 to brake cylinder 173 either directly, as shown, or by piloting a brake cylinder relay valve (not shown). Meanwhile, the brake controlling valve device (not shown) on each connected car will respond to the reduction in brake pipe pressure to effect a corresponding degree of brake application on said car.

If brake valve handle 25 was moved to service position, the same connections will be established but a full service reduction in equalizing reservoir pressure and hence in brake pipe pressure will be effected for causing a full service application of brakes.

To manually effect an emergency application of brakes, brake valve handle 25 is moved to an emergency position. For the present, it need merely be noted that by moving handle 25 to emergency position, vent valve device 16 will be operatively opened and vent the brake pipe 3 at large capacity for thereby causing brake controlling valve device 4 to provide in the brake cylinder 173, either directly as shown or by piloting a brake cylinder relay valve (not shown), fluid at a higher pressure than obtained during a full service application of brakes. The brake controlling valve devices on the cars will also operate to cause higher pressures to be provided on such cars.

*Suppression of train control or safety control or overspeed application of brakes*

Assume now that, while the apparatus is fully charged and the brake valve handle 25 is in release position, control pipe 209 should be connected to atmosphere. This will occur if magnet 162 of device 8 should become deenergized, such as due to the train exceeding a prescribed speed within a restricted speed zone, because deenergization of said magnet will cause device 8 to establish connection 205 and thus permit fluid to flow from pipe 209 to atmosphere via passage 137, chamber 156, pipe 158, restricted line 159 and whistle 160; or it will occur if the engineer removes his foot from pedal 165 and connects pipe 158 and hence pipe 209 to atmosphere via restricted line 166 and whistle 167; or it will occur if magnet 317 of device 312 becomes deenergized due to an unfavorable traffic condition or stop signal and causes spring 323 to unseat valve 320 and permit pressure fluid to flow from pipe 209 to atmosphere via pipe 332, cavity 331 of suppression valve 313, passage 324, unseated valve 320, choke 327 and whistle 326.

Thus, in each case, an audible warning will be promptly sounded (by whistle 160, 167 or 326) to warn the engineer that an "automatic control application of brakes" will be effected automatically unless he demonstrates his alertness within a predetermined interval of time, such as about six seconds from the time the warning sound commences. This time interval is determined by the capacity of volume 211 from which previously stored fluid under pressure will flow past check valve 212 to pipe 209, and by the flow capacity of charging choke 138 in relation to the flow capacity of restricted lines 159, 166 or choke 327, as the case may be. If the warning sounds, the engineer must promptly demonstrate his alertness by redepressing pedal 165 (if removal of his foot therefrom had initiated the warning) or by moving brake valve handle 25 out of release position to initiate a brake application (if the warning was initiated by deenergization of either magnet 162 or 317).

If the brake valve handle 25 is promptly moved far enough into the application zone to provide a brake cylinder pressure of at least 25 p.s.i. or is moved to service position at which a higher brake cylinder pressure will be provided, fluid will be supplied from the brake cylinder 173 via pipe 172, double check valve 203, and pipe and passage 153 to chamber 152 at a high enough pressure to shift piston 151 and hence suppressing valve 157 to a suppressing position against resistance of spring 154. In suppressing position, valve 157 will cut off passage and pipe 158 from passage 137 and control pipe 209, and thus prevent a safety control or an overspeed application of brakes from occurring if the engineer should remove his foot from pedal 165 or if overspeed magnet 162 should become deenergized. On the other hand, if brake valve handle 25 is moved to a suppression position or to emergency position, in both of which positions suppression pipe 204 is charged with pressure fluid from main reservoir passage 40 via suppression valve device 18, then fluid at main reservoir pressure will flow via pipe 204, double check valve 203 and pipe 153 to chamber 152 of device 300 for operatively maintaining suppressing valve 157 in suppressing position so long as said handle is maintained in either of these positions. However, a train control application of brakes is not suppressed by suppressing valve 157 but by valves 313, 314 in train control valve device 301 in the manner now to be described.

Assume now that the warning was initiated responsively to deenergization of train control magnet 317 and consequent opening of valve 320; and that the engineer desires to avoid occurrence of an automatic train control application of brakes. Since the brake apparatus is conditioned for freight service, as previously assumed, and it is desirable to gather slack gently on long freight trains, the engineer within the predetermined time interval should move brake valve handle 25 from release position initially a slight extent into the application zone to provide a relatively low brake cylinder pressure sufficient to gather slack gently, and then before the lapse of another time interval move said handle to suppression position, for reasons now to be described.

Since passage 103 and pipe 309 are vented via suppression valve device 18 in all positions of the brake valve handle 25 except release position, it will be apparent that as soon as said handle is moved into the application zone to operatively provide the low brake cylinder pressure, pipe 309 and hence passage 329 and chamber 329a will be connected to atmosphere. Since suppression pipe 204 and pipe 333 will still be vented, double check valve 314 will be maintained in its left-hand position; and hence upon venting of chamber 329a, pressure fluid will be supplied from temporary suppression volume 335 via pipe and passage 334 and passage 328 to chamber 328a for shifting suppression valve 313 against resistance of spring 330 to a suppressing position, in which pipe 332 and control pipe 209 are cut off from passage 324 to stop blow-down of control pipe pressure. However, this will provide only temporary suppression of the automatic train control application of brakes because pressure fluid will flow from the temporary suppression volume 335 via a branch of passage 334 and a choke 395 to the seating side of a check valve 396 and unseat the latter against resistance of a light spring 397 and flow past said check valve to atmosphere via the then vented pipe 309 at the rate controlled by the combined flow capacities of the parallel-arranged chokes 395, 392 and if and when pressure in chamber 328a is thus reduced sufficiently, spring 330 will restore valve 313 to its non-suppressing position, in which it is shown, and thus permit resumption of blow-down of pressure from control pipe 209 and pipe 332 via valve 320 if magnet 317 is still deenergized.

It is therefore important that the brake valve handle 25 be moved to suppression position shortly after initiating the light slack-gathering application and in any event before the lapse of said other time interval which corresponds substantially to the length of time (preferably about 20 seconds) the suppression valve 313 will remain in suppressing position and is thus determined by the flow capacities of chokes 395, 392 and size of volume 335. With brake valve handle 25 in suppression position, control valve device 14 will be conditioned to effect a full service reduction in equalizing reservoir pressure; and suppression valve device 18 will be conditioned to charge suppression pipe 204 with pressure fluid from main reservoir passage 40 (instead of venting pipe 204 as in service position) and will vent passage 103 and hence pipe 309.

Thus, when brake valve handle 25 is moved to suppression position, the main reservoir pressure fluid supplied to passage 333 via suppression pipe 204 and pipe 333 will shift double check valve 314 rightward. Valve 314 will thereupon disconnect the temporary suppression volume 335 from passage 328 and then connect the latter to pipe 333 for causing the suppression valve 313 to be shifted to (or, if already there, maintained in) suppressing position against resistance of spring 330. Under this condition, the automatic train control application of brakes will be suppressed "permanently" as long as brake valve handle 25 remains in suppression position.

It will be understood that the brake valve handle 25 may always be moved directly from release position to suppression position or to emergency position if the train is short and/or gentle gathering of slack is not desired or expedient. Since suppression pipe 204 and hence pipe 333 are always charged with fluid at main reservoir pressure so long as brake valve handle 25 is in suppression position or in emergency position, double check valve 314 will be biased to its right-hand position at such times and thus "permanently" suppress a train control application of brakes.

*Train control, safety control or overspeed application of brakes*

Assume now that, while brake valve handle 25 is in release position, whistle 326, 160 or 167 sounds for the respective reasons above explained, but the engineer for any reason fails to heed the warning. A two-stage "automatic control application of brakes" will be effected automatically in the following manner.

Pressure in control pipe 209 will blow down via such whistle; and after the aforementioned predetermined time interval of six seconds, pressure in chamber 136 will have been reduced sufficiently (such as about 35 p.s.i.) below main reservoir pressure in chamber 133 to cause piston 132 to move up against resistance of spring 135 and thus carry application valve 129 to an application position. With application valve 129 in application position, passage 137 and hence chamber 136 will be uncovered to chamber 131 and thus to lockover passage and pipe 208 which is then vented via the suppression valve device 18, with the result that chamber 136 will be maintained vented for assuring that valve 129 will remain in application position (provided brake valve handle 25 is not moved to suppression or emergency position in which pipe 208 is cut off from atmosphere). Also power knockout pipe 142 will be cut off from vent port 143 and connected by cavity 139 to a branch of main reservoir passage 134 for causing main reservoir air to actuate the usual power cut-off device (not shown) and also flow to pipe 349, for reasons herinafter explained. Also, equalizing reservoir passage 146 will be cut off from passage 305 and hence passage 84 and passage 146 will be connected by cavity 141 to passage 149 for causing pressure in equalizing reservoir 2 to equalize promptly via passages 146, 149, pipe 144, and passage 356 into chamber 355 of regulating valve device 350 of device 302.

Meanwhile, some of the pressure fluid supplied from the main reservoir to pipe 349 will flow without restriction to chamber 372 of device 351 and immediately offset the opposing effect of main reservoir pressure then present in chamber 373 due to handle 25 still being in release position. Hence, spring 374 will shift cut-off valve 371 down to cut-off position, in which it is shown, for cutting off chamber 354 of device 350 from the brake pipe 3 and bottling up the pressure in said chamber at substantially the normal full charge value of brake pipe pressure and hence of equalizing reservoir pressure. Meanwhile, since equalizing reservoir pressure has equalized into chamber 355 via the application valve 129 in application position and equalizing reservoir pressure is initially substantially equal to the bottled up value of pressure in chamber 354, spring 359 (partially assisted by spring 360) will promptly shift piston 353 up and carry valve 357 to its one limit position in which it is shown.

With valve 357 in its one limit position, fluid under pressure will initially flow from the equalizing reservoir 2 to atmosphere at a service rate controlled by a service choke 398 and via one communication 146, 141, 149, 144, 356, 355, 398, 366, 364, 367. However, when equalizing reservoir pressure in chamber 355 has reduced a chosen degree (such as about 7 p.s.i.) below the pressure trapped in chamber 354, piston 353 will have been moved downward far enough against resistance of light spring 359 to carry valve 357 to an intermediate position, defined by contact of seat 362 with washer 369 without compression of spring 360. With valve 357 in intermediate position, passage 366 will be cut off from vent port 367 by O-ring seal 399 but maintained connected to passage 365 by cavity 364.

Since timing valve 382 will initially be biased by spring 380 to normal position, in which it is shown, for cutting off passage 365 from vent port 384, the reduction in equalizing reservoir pressure will thus cease temporarily when valve 357 moves to intermediate position and until chamber 379 and timing volume 390 are charged from pipe 349, via and at the rate controlled by timing choke 386, to a pressure sufficient to cause piston 378 to move downward against resistance of said spring and carry valve 382 to its venting position in which cavity 383 connects passage 365 to vent port 384. Fluid under pressure will thereupon flow from the equalizing reservoir 2 to atmosphere at a service rate via another communication 146, 141, 149, 144, 356, 355, 398, 364, 365, 383, 384, until equalizing reservoir pressure in chamber 355 of device 350 is reduced a chosen greater degree (such as about 23 p.s.i.) below the pressure trapped in chamber 354. The piston 353 will then have moved downward far enough against the combined resistance of springs 361, 360 to shift regulating valve 357 to its other (lower) limit position in which passage 366 and hence the equalizing reservoir 2 is cut off from passage 365 by O-ring 399 and from vent port 367 by an O-ring 400.

It will thus be seen that if the application valve 129 for any reason moves to application position while valve 388 is in freight position, an automatic split reduction in equalizing reservoir pressure will be effected in two separate and distinct stages, for causing the relay valve device 13 to effect a corresponding two-stage reduction in brake pipe pressure. During the first stage, a slight (about 7 p.s.i.) reduction in equalizing reservoir pressure will be effected at a service rate by regulating valve device 350 to cause slack to be gathered gently during and in consequence of the corresponding light reduction in brake pipe pressure. This reduction in equalizing reservoir pressure will then cease temporarily until, after a preselected time period has elapsed, the timing valve device 352 moves to venting position and initiates the second stage. The size of choke 386 and volume 390 and value of spring 380 preferably are so selected that this preselected time period is about 20 seconds measured from the instant the application valve 129 moves to application position. The second stage of reduction in equalizing reservoir pressure will be terminated by the regulating valve device 350 after equalizing reservoir pressure has been reduced a further degree sufficient to cause a full service application of brakes.

It should here be noted that if a two-stage or so-called automatic split reduction in brake pipe pressure is desired, but it is preferred that equalizing reservoir pressure and hence brake pipe pressure be reduced to atmosphere (rather than merely sufficient to cause a full service application of brakes, as just described), this may be readily accomplished without substantial modification of the apparatus. More specifically, the spring 360 and seat washer 369 should be replaced by a non-collapsible rigid sleeve which bears against shoulder 368 and is held in place by retaining ring 370 (or one of smaller inside diameter if said sleeve does not have an outturned flange). With the device 350 as thus modified, regulating valve 357 will have only two operating positions (corresponding to the upper limit position and intermediate position already defined) and will never cut off passage 366 from passage 365. Hence, when the timing valve 382 connects passage 365 to vent port 384, the equalizing reservoir 2 will be completely vented at the service rate controlled by choke 398.

*Means preventing belated suppression of a train control application of brakes*

If venting of control pipe 209 is initiated as a result of deenergization of train control magnet 317 and the consequent connection of branch pipe 332 to atmosphere via valve 313 and unseated valve 320, the following sequence of events will occur. As soon as valve 320 is unseated, fluid under pressure in volume 211 and control pipe 209 will flow past said valve and via passage 338 to chamber 336 between valves 315, 316. This will cause valve 316 to move rightward relative to valve 315 and against resistance of spring 339 because stop reservoir 347 and passage 346 will then be vented. With valve 316 in its right-most position, cavity 343 will connect power knock-out pipe 142 and its branch pipe 349 to chamber 340 and also, via choke 345, to stop reservoir 347. However, this will be without consequence so long as pipe 142 remains vented.

Since spring 339 is light, valve 316 will remain in its right-most position after pressure in control pipe 209 and hence in chamber 136 of device 300 has reduced the illustrative 35 p.s.i. below main reservoir pressure in chamber 133 and has caused the application valve 129 to be actuated to application position in which, as previously described, pipes 142 and 349 are charged with fluid at main reservoir pressure. Hence, some of the fluid at main reservoir pressure supplied to pipe 349 will flow via cavity 343 of valve 316 and without restriction to chamber 340 for promptly shifting valve 315 rightward to a lockover position defined by abutting contact with valve 316. With valve 315 in this position, cavity 342 will connect pipe 209 and its branch 332 to passage 338 and to atmosphere via whistle 326 and in by-pass of valve 320 to assure that control pipe 209 will be vented via choke 327 (which is of larger flow capacity than choke 138). Thus, for reasons of safety, the interlock valve device 315, 316 assures that once the application valve 129 moves to application position to effect a train control application of brakes, such application cannot be suppressed by reenergization of magnet 317 or by the engineer belatedly moving brake valve handle 25 to suppression position.

Meanwhile, some of the pressure fluid supplied to pipe 349 will flow via cavity 343 and at the restricted rate controlled by choke 345 to the stop reservoir 347 and to the spring side of valve 316. After the train control application has been effected and following a time interval determined by the size of choke 345 and by the size of stop reservoir 347, pressure in the stop reservoir and hence in passage 346 will build up to substantial equality with main reservoir pressure in chamber 340 and permit spring 339 to shift valves 316, 315 leftward in unison to their normal positions in which they are shown and in which they are ineffective to connect control pipe 209 to whistle 326.

Function of valve 304 in device 300

From the foregoing, it will be understood that during an automatic control application of brakes (that is, during either a train control, safety control or overspeed application of brakes), application valve 129 will connect equalizing reservoir pipe 146 to passage 149, pipe 144 and hence device 302 for causing a two-stage or split reduction in equalizing reservoir pressure of a degree corresponding substantially to that obtained during a manually effected full service application of brakes.

The engineer may, however, always manually effect a brake application of greater degree while such automatic control application is in effect. For instance, if brake valve handle 25 is moved into an overreduction zone (in which a greater than full service reduction in equalizing reservoir pressure is effected of a selectable degree but at a service rate), fluid under pressure will flow from the equalizing reservoir 2 to atmosphere via a release communication including 146, 306, 311, 84 and control valve device 14 and in bypass of the automatic split reduction valve device 302, it being noted that check valve 304 will permit flow in such direction. However, check valve 304 is necessary to prevent flow of pressure fluid in the reverse direction (that is, from control valve device 14 to equalizing reservoir 2) in the case where the application valve 129 is in application position at a time when brake valve handle 25 is in release position, and the devices 14, 19 are therefore conditioned by said handle to normally cause the equalizing reservoir to be charged to a predetermined full charge value. Valve 304 will also perform the same function when brake valve handle 25 is in the application zone and the apparatus is conditioned for passenger service.

This follows from the fact that during the conditions above recited (that is, brake valve handle in release position during freight or passenger service, or in the application zone during passenger service), an equalizing reservoir cut-off valve (not shown) of device 19 will be operatively held unseated by a fluid pressure motor and hence rendered ineffective; said cut-off valve being in the form of a check valve which always permits flow of pressure fluid from passage 84 toward control valve device 14 and, unless held unseated, prevents flow in the reverse direction.

Release of train control, overspeed or safety control application of brakes

To release a train control, overspeed or safety control application of brakes, the magnets 317 and 162 must be energized in response to favorable track signals, pedal 165 must be depressed, and interlock valve device 315, 316 must be in its normal position, in which it is shown. Since passage 137 and chamber 136 are connected to lockover pipe 208 by the application valve 129 in application position, brake valve handle 25 must be moved to suppression position or emergency position (if not already there) to cause suppression valve device 18 to cut off lockover pipe 208 and hence chamber 136 from atmosphere to permit effective recharging of passage 137 and chamber 136 with pressure fluid from main reservoir pipe 41 via choke 138.

Some of the pressure fluid supplied to passage 137 will flow past the end of valve 129 to chamber 308 and promptly shift release control valve 303 downward, because chamber 307 will be vented via pipe 309 which, as already stated, is vented in all positions of the brake valve handle 25 except release position. After valve 303 moves to lower position, in which passage 305 is disconnected from passage 84, chamber 136 will be charged to a high enough value to permit spring 135 to return application valve 129 to normal position, in which it is shown. Valve 303 will remain in lower position indefinitely, however, until brake valve handle 25 is moved to release position, in which it charges pipe 309 and vents lockover pipe 208 and thereby causes return of valve 303 to its upper or normal position. With brake valve handle 25 in release position and valve 303 in upper position, fluid under pressure will flow from control valve device 14 via the then unseated equalizing reservoir cut-off valve (not shown) of device 19, passage 84, cavity 141, valve cavity 310, passage 305 and equalizing reservoir passage 146 to equalizing reservoir 2 for charging the latter to normal charge value and effecting a complete release of a train control, overspeed or safety control application of brakes (or the manually effected brake application of greater degree superimposed thereon).

Valve 303 thus prevents graduated release of a train control, overspeed or safety control application of brakes, even though the apparatus is conditioned for passenger service during which the aforementioned equalizing reservoir cut-off valve of device 19 is held open in all positions of brake valve handle 25 and thus normally permits graduated release of brakes.

During this complete release of brakes, the various components will operate in substantially the same manner as described in connection with initial charging, and at completion of such release will have assumed the same positions they assumed at completion of initial charging.

Passenger service

To condition the apparatus for passenger service, the selector valve device 6 is actuated to a passenger position to supply pressure fluid to the motor of the device 19 to cause the aforementioned equalizing reservoir cut-off valve to be held unseated, irrespective of the position of brake valve handle 25. As already explained, this will permit the equalizing reservoir 2 to be recharged to any desired degree and thus effect a corresponding degree of partial or graduated release of brakes, except following a train control, safety control or overspeed application of brakes.

Also, to condition the apparatus for passenger service, the valve 388 is moved to passenger position to cut off timing volume 390 from pipe 387. Thereafter, during a train control, overspeed or safety control application of brakes, a continuous full service reduction (rather than an automatic split reduction) in equalizing reservoir pressure will be effected because as soon as application valve 129 moves to application position and supplies fluid at main reservoir pressure to knock-out pipe 142, chamber 379 will be rapidly charged via choke 386 to a pressure high enough to shift timing valve 382 to its venting position. Thus, by the time the illustrative 7 p.s.i. reduction in equalizing reservoir pressure has been effected via vent port 367, and the regulating valve 357 has moved down to its intermediate position in which it connects passage 366 solely to passage 365, the timing valve 382 will have been shifted to venting position in which it connects passage 365 to vent port 384. This will insure an uninterrupted reduction in equalizing reservoir pressure at the service rate controlled by choke 398. An uninterrupted reduction is effected in passenger service because trains are much shorter and hence it is not necessary to gently gather slack. Such reduction will cease when regulating valve 357 moves to its lower limit position, such as will occur when at least a full service reduction has been effected, if spring 360 and washer 369 are retained; or such reduction will continue until the equalizing reservoir is completely vented, if spring 360 and washer 369 are replaced by a rigid sleeve that would prevent movement of said regulating valve to lower limit position.

Since split reductions are not generally made during passenger service, it will be understood that the engineer may and preferably should move brake valve handle 25 to suppression position (or to emergency position) to "permanently" suppress a train control, safety control or overspeed application of brakes upon the sounding of whistle 326, 167 or 160; but a temporary suppression of such application will be effected if suppressing valve 313 or 157 is actuated to its previously-defined suppressing position.

If temporary suppression of a train control application is not desired, however, valve 313 may be removed, or else a plug 401 may be removed to permanently connect a branch of control passage 332 with passage 324.

*Summary*

It will thus be seen that the improved brake apparatus embodies a novel automatic split reduction valve device 302 that, when conditioned for freight service by connection of pipe 387 to timing volume 390 by valve 388 in freight position, will effect an automatic split reduction in equalizing reservoir pressure during either a train control, safety control or overspeed application of brakes. This reduction is accomplished in two successive and interrupted steps or stages. The first stage is of a chosen small degree, such as 7 p.s.i., corresponding to the bias effect of spring 359, to cause gentle gathering of slack through a long freight train. This is followed by a predetermined delay period fixed primarily by the selected capacity of volume 390 and size of timing choke 386. Then the second stage is initiated which is of a greater degree sufficient to effect at least a full service reduction in equalizing reservoir pressure and corresponds to the combined bias effects of springs 359, 360. It is important to note that these degrees of reduction will desirably remain constant irrespective of whether, during freight service, the normal charge value of brake pipe pressure is preselected at 70 p.s.i. (used on relatively level terrain) or at a value between 90 p.s.i. and 110 p.s.i. (used in mountainous terrain).

Also, interlock valve device 315, 316 is provided for assuring that a train control application, once initiated by movement of application valve 129 to application position, cannot be interrupted or suppressed if the engineer belatedly moves brake valve handle 25 to suppression position.

A communication including 146, 141, 306, 304, 311, 84 is provided for always permitting release flow of pressure fluid from equalizing reservoir 2 to atmosphere via control valve device 14 if, while a train control, safety control or overspeed application of brakes is in effect, brake valve handle 25 should be moved into an overreduction zone to manually effect a greater degree of brake application. Check valve 304, which prevents flow in the reverse direction through said communication, is provided to assure that pressure fluid will not flow from the control valve device 14 to the equalizing reservoir 2 and attempt to recharge the latter if the brake valve handle 25 is in release position while equalizing reservoir pressure is being reduced automatically to effect an overspeed, train control or safety control application of brakes.

Release control valve 303 cooperates with application valve 129 to prevent graduated release of a train control, safety control or overspeed application of brakes even if the apparatus should be conditioned for passenger service.

Having now described the invention, what I claim as new and desire to secure by Letters Patent is:

1. A locomotive brake apparatus comprising, in combination, a normally charged equalizing reservoir in which pressure of fluid is reduced for causing a brake application, a communication including flow-restricting means via which pressure fluid may flow from the equalizing reservoir to atmosphere at a restricted rate, application valve means and a regulating valve means each interposed in and forming part of said communication, said application valve means having a normal position in which it closes said communication and an application position in which it permits flow through said communication and connects the equalizing reservoir to one chamber, means responsive to a reduction in fluid pressure in a normally charged control chamber to below a chosen value to actuate said application valve means to application position, said regulating valve means being biased by a spring to one position for permitting flow through said communication and operative in another position to prevent such flow, and a fluid pressure motor subject opposingly to pressure of fluid in said one chamber and to an opposing fluid pressure corresponding substantially to the normal charge value of equalizing reservoir pressure for actuating said regulating valve means to its said other position when pressure in said one chamber is reduced a chosen degree below said opposing pressure, whereby upon movement of said application valve means to application position equalizing reservoir pressure will always be reduced an amount corresponding to the selected force of the bias spring irrespective of the preselected normal charge value of equalizing reservoir pressure.

2. Brake apparatus according to claim 1, including operator-controlled means for controlling pressure of fluid in a different communication that is disconnected from the equalizing reservoir by the application valve means in application position, and a check valve always permitting flow of pressure fluid therepast from the equalizing reservoir to the different communication in bypass of the application valve means and preventing flow of pressure fluid therepast in the reverse direction, whereby equalizing reservoir pressure may always be reduced to below said chosen degree by reducing the pressure in said different communication and irrespective of the positioning of said application valve means.

3. In a fluid pressure brake equipment, apparatus for effecting an automatic split reduction in pressure of fluid in an equalizing reservoir upon initiation of an automatic control application of brakes, said apparatus comprising means operative to connect a chamber to the equalizing reservoir during an automatic control application of brakes, regulating valve means subject to pressure of a light spring and after a predetermined movement to pressure of a heavier spring and biased by the light spring to one position in which it connects said chamber to atmosphere, and operable against resistance of the light spring to another position in which it disconnects said chamber from atmosphere and connects said chamber to a passage, and operable against resistance of both springs to a third position in which said chamber is cut off from atmosphere and from said passage, motor means subject opposingly to pressure of fluid in said chamber and to an opposed pressure corresponding substantially to the normal charge value of equalizing reservoir pressure for actuating said regulating valve means to said other position upon a slight reduction in equalizing reservoir pressure corresponding to the bias effect of the light spring and to said third position upon a greater reduction corresponding to the bias effects of both springs, and timing means set into operation by the first-mentioned means for connecting the passage to atmosphere after a predetermined interval of time, whereby reduction in equalizing reservoir pressure will be temporarily halted after said regulating valve means moves to said other position and until said timing means vents the passage and will be terminated upon movement of said regulating valve means to said third position.

4. Apparatus according to claim 3, wherein said opposing pressure is provided by a fluid pressure in another chamber open via a restriction to a brake pipe, and including cut-off valve means interposed between the other chamber and brake pipe and actuated during an automatic control application of brakes.

5. In a locomotive fluid pressure brake apparatus of the type comprising a normally charged equalizing reservoir in which pressure of fluid is reduced for causing a brake application, the combination of means including flow-restricting means providing two restricted flow communications interposed between the equalizing reservoir and atmosphere, application valve means normally cutting off said communications from the equalizing reservoir and operatively responsive to a reduction in pressure of fluid in a normally charged control chamber to an application position to connect the equalizing reservoir to said communications and to another chamber, regulating valve means biased by a bias spring to one position to connect one of said communications to atmosphere and operative in another position to disestablish such connection, a fluid pressure motor subject opposingly to pressure of fluid in said other chamber and to an opposing fluid pressure corresponding substantially to the normal charge value of equalizing reservoir pressure for actuating said regulating valve means to said other position when equalizing reservoir pressure as noted in said other chamber is reduced a chosen degree below said opposing pressure, and timing means including a timing valve for causing the other of said communications to be connected with the atmosphere a chosen interval of time following operation of said application valve means to application position, whereby brakes will be applied in two separate successive stages interrupted by a time period corresponding to that between operation of said regulating valve means to its other position and operation of said timing valve, and whereby the first stage will always correspond to the bias effect of the bias spring irrespective of the preselected normal charge value of equalizing reservoir pressure.

6. A brake apparatus according to claim 5, wherein said timing means includes a timing volume connected via a timing choke to a normally vented conduit, and said timing valve is subject opposingly to pressure of fluid in the timing volume and to a bias force and is biased by said bias force to a normal position to cut off said other communication from atmosphere until timing volume pressure exceeds a certain value, and wherein said application valve means when in application position supplies fluid under pressure to the conduit for supply to the timing volume via the timing choke.

7. A brake apparatus according to claim 5, wherein said regulating valve means also controls a flow connection forming part of said other communication, and said regulating valve means is operative to a third position when pressure in said other chamber is reduced a further degree, greater than said chosen degree, below said opposing pressure to close said flow connection and accordingly limit the degree of reduction in equalizing reservoir pressure and thereby prevent complete venting of the equalizing reservoir via said other communication.

8. A brake apparatus according to claim 7, including a brake valve device comprising operator-controlled means for controlling pressure of fluid in a different communication leading to said application valve means, the latter being operative in normal position to permit and in application position to prevent flow of fluid under pressure in both directions between said different communication and the equalizing reservoir, and a check valve for always permitting release flow of pressure fluid therepast from the equalizing reservoir to the different communication in bypass of said application valve means upon a reduction in pressure in said different communication and preventing flow therepast in the reverse direction.

9. A brake apparatus according to claim 5, including a brake valve device comprising operator-controlled means for operatively controlling pressure of fluid in a different communication normally connected to the equalizing reservoir, said application valve means and a release control valve each controlling respective normally established flow connections forming part of and arranged in serial relation in said different communication, said application valve means being operative in application position to close one of said flow connections and supply pressure fluid to a third chamber, said release control valve being subject opposingly to pressures of fluid in said third chamber and in a fourth chamber and operative when pressure in said third chamber exceeds that in said fourth chamber to close the other of said flow connections, said operator-controlled means being operative only in a certain position, in which a complete release of brakes is effected, to supply pressure fluid to said fourth chamber and vent said third chamber, whereby if said application valve means has operated to application position the equalizing reservoir can be recharged only if following return of said application valve means to normal position said operator-controlled means is moved to said certain position to effect a complete release of the brake application.

10. A brake apparatus according to claim 5, including other valve means operative only upon a predetermined control condition to connect the control chamber to a different chamber having restricted connection with the atmosphere, and interlock valve means biased to a cut-off position and operatively responsive to supply of pressure fluid to said different chamber to another position in which it connects a certain chamber to a conduit, said conduit being charged with pressure fluid responsively to operation of said application valve means to application position, said interlock valve means being operatively responsive to charging of said certain chamber with pressure fluid from said conduit to a different position in which said control chamber is connected to said different chamber and thereby to atmosphere in bypass of said other valve means to prevent suppression of an application of brakes once said application valve means has moved to application position.

11. A brake apparatus according to claim 5, including train control valve means normally positioned to cut off said control chamber from a different chamber having restricted connection with the atmosphere, a normally vented stop reservoir, interlock valve means comprising two adjacent valve members each subject at their adjacent ends to pressure of fluid in said different chamber, one of said valve members being subject at its opposite end to pressure of fluid in a certain chamber having restricted connection with the stop reservoir, the other of said valve members being subject at its opposite end to stop reservoir pressure, light bias means for biasing said valve members in unison to one limit position, said train control valve means being operatively responsive to an unfavorable track condition to a venting position for connecting the control chamber to said different chamber to release control chamber pressure at a restricted rate, said other valve member being moved independently of said one valve member by pressure fluid supplied to said different chamber to connect said certain chamber with a conduit, said conduit being charged with pressure fluid by said application valve means in application position to charge said certain chamber and cause said one valve member to move independently of the other to a position in which it connects said control chamber to said different chamber and hence to atmosphere in bypass of said train control valve means to assure that once the application valve means attains its application position a train control application cannot be suppressed, said interlock valve means being returned to said one limit position by said light bias means when stop reservoir pressure increases to substantial equality with the pressure in said certain chamber.

12. In a locomotive fluid pressure brake apparatus of the type comprising a normally charged equalizing reservoir in which pressure of fluid is reduced for causing a brake application, the combination of valve means operative only upon a predetermined control condition to connect a normally charged control chamber to another chamber having restricted connection with atmosphere, application valve means operatively responsive to a chosen reduction in pressure of fluid in the control chamber to an application position in which it permits pressure fluid to flow from the equalizing reservoir to atmosphere and supplies pressure fluid to a conduit, and interlock valve means operative upon supply of pressure fluid to said other chamber to one position in which it connects a certain chamber to said conduit, said interlock valve means being operative upon charging of said certain chamber with pressure fluid from said conduit to a different position in which the control chamber is connected to said other chamber and thereby to atmosphere in bypass of the first-mentioned valve means to prevent suppression of an application of brakes once said application valve means has moved to application position.

13. A locomotive fluid pressure brake apparatus comprising means responsive to a predetermined control condition to establish a restricted communication between a control chamber and atmosphere, means responsive to a chosen reduction in control chamber pressure to cause an automatic control application of brakes, a temporary suppression volume having restricted connection with one passage, a double check valve operative to connect to another chamber either the temporary suppression volume or another passage according to which of these latter two contains fluid at the higher pressure, a suppression valve interposed in said communication and subject opposingly to the pressures in said other chamber and in said one passage and operative responsively to charging of said other chamber to a suppressing position for preventing flow through said communication, means biasing the suppressing valve to a non-suppressing position in which it permits flow through said communication, and a brake valve device including operator-controlled means operable to one position for causing release of brakes while concurrently venting said one passage and supplying pressure fluid to said other passage and operable to at least one other position for causing an application of brakes while concurrently supplying pressure fluid to said one passage and venting said other passage, whereby if the operator-controlled means is moved out of said one position the suppression valve will be operated to temporarily suppress an automatic control application of brakes until pressure in said temporary suppression volume blows down via said one passage and whereby said suppression valve will be maintained in suppressing position while the operator-controlled means is in said other position.

No references cited.